(12) United States Patent
Staggs

(10) Patent No.: US 6,711,479 B1
(45) Date of Patent: Mar. 23, 2004

(54) AVIONICS SYSTEM FOR DETERMINING TERMINAL FLIGHTPATH

(75) Inventor: Thomas J. Staggs, Woodinville, WA (US)

(73) Assignee: Honeywell International, Inc., Morristown, NJ (US)

( * ) Notice: Subject to any disclaimer, the term of this patent is extended or adjusted under 35 U.S.C. 154(b) by 3 days.

(21) Appl. No.: 10/234,415

(22) Filed: Sep. 3, 2002

Related U.S. Application Data

(60) Provisional application No. 60/316,359, filed on Aug. 30, 2001.

(51) Int. Cl.[7] .................................. G06F 19/00
(52) U.S. Cl. .................. 701/16; 701/18; 701/200; 340/951; 340/976; 342/33; 342/357.08; 244/187
(58) Field of Search .............................. 701/1, 3, 4, 14, 701/16, 17, 18, 200, 213; 340/947, 951, 948, 971, 972, 976, 988; 342/33, 357.01, 357.08; 244/183, 185, 187

(56) References Cited

U.S. PATENT DOCUMENTS

| | | | | | |
|---|---|---|---|---|---|
| 4,104,612 A | * | 8/1978 | Lowe | ............... | 340/973 |
| 4,106,731 A | * | 8/1978 | Bliss | ............... | 244/188 |
| 4,316,252 A | * | 2/1982 | Cooper | ............... | 701/16 |
| 4,554,545 A | * | 11/1985 | Lowe | ............... | 340/980 |
| 5,343,395 A | * | 8/1994 | Watts | ............... | 701/16 |
| 5,377,937 A | * | 1/1995 | LaMay et al. | ............... | 244/185 |
| 6,216,064 B1 | | 4/2001 | Johnson et al. | ............... | 701/4 |

\* cited by examiner

*Primary Examiner*—Thomas G. Black
*Assistant Examiner*—Ronnie Mancho
(74) *Attorney, Agent, or Firm*—Charles J. Rupnick

(57) ABSTRACT

A method, avionics apparatus and computer program for determining a terminal flight path, including access to aircraft position information provided by a Global Positioning System (GPS) receiver. The method apparatus and computer program determine an Intended Touchdown Point (ITP), which is the desired landing location on an intended runway; determine a Current Touchdown Point (CTP), which is where the aircraft will land given its current glidepath and is a function of the current trajectory, configuration and engine thrust; determine a correspondence of the CTP and ITP and generate an output signal as a function of the correspondence, which is displayed on a cockpit display device, annunciated on a cockpit speaker, or both.

47 Claims, 7 Drawing Sheets

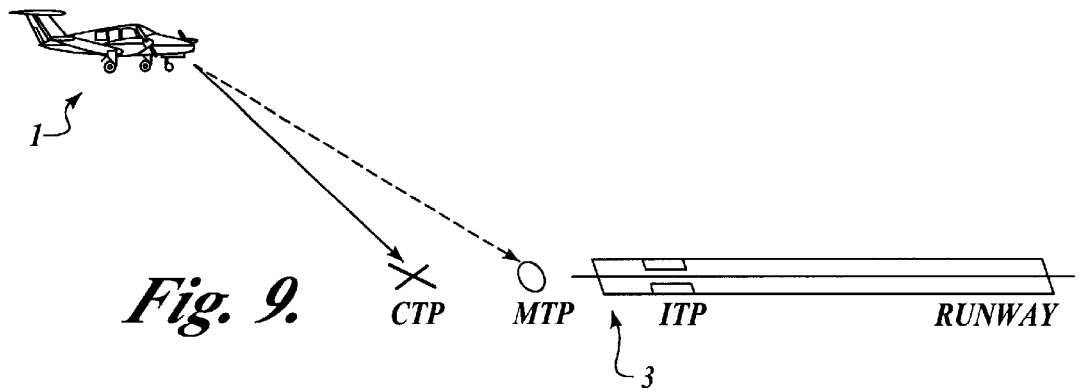
Fig. 9.
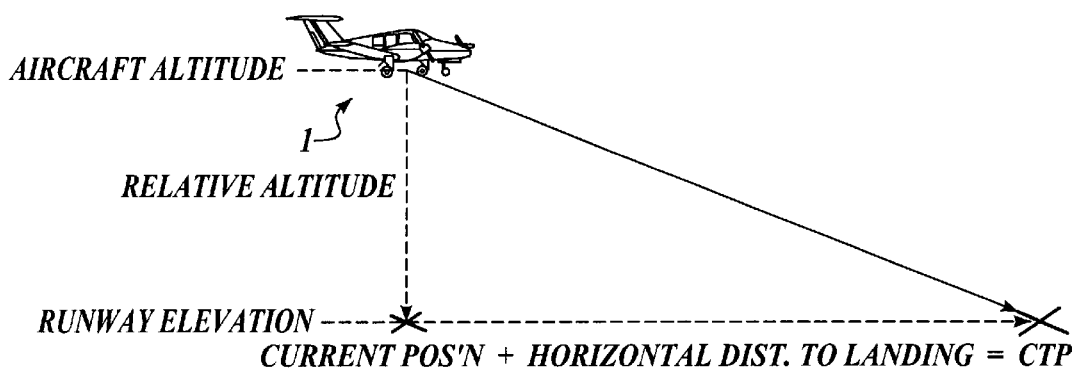
Fig. 10. *(PRIOR ART)*

CURRENT POS'N + HORIZONTAL DIST. TO LANDING + ADJUSTMENT FACTOR = CTP

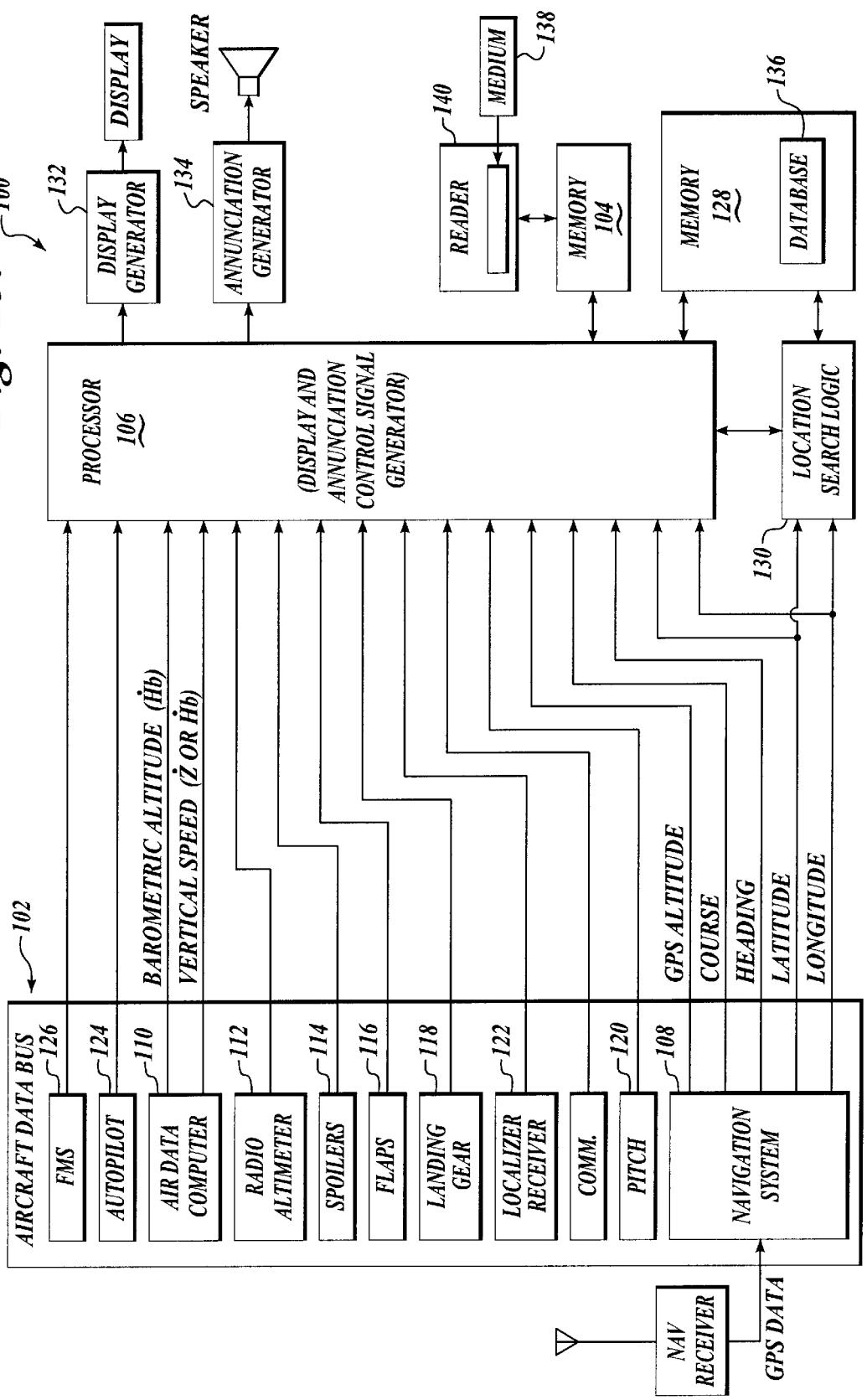

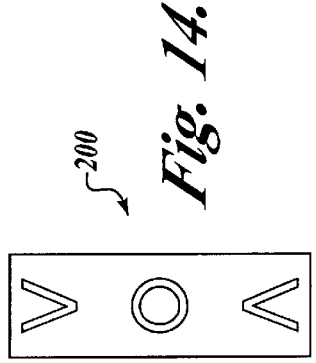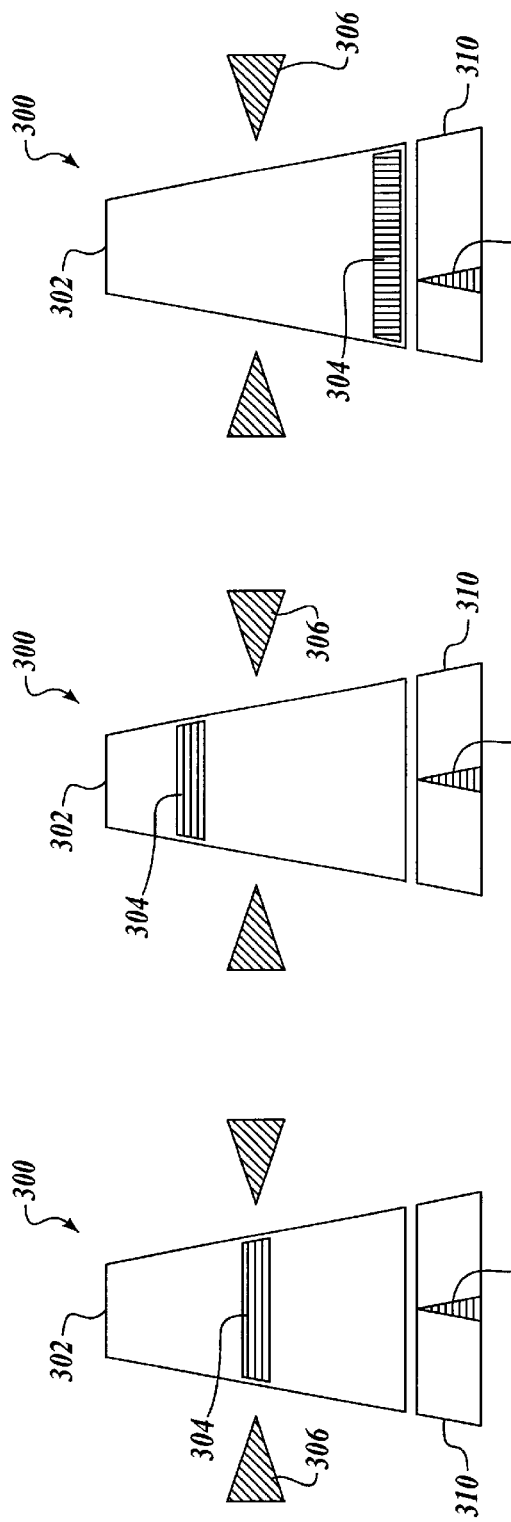

AVIONICS SYSTEM FOR DETERMINING TERMINAL FLIGHTPATH

This application claims the benefit of U.S. Provisional Application Serial No. 60/316,359, filed in the name of Thomas J. Staggs on Aug. 30, 2001, the complete disclosure of which is incorporated herein by reference.

FIELD OF THE INVENTION

The present invention relates to avionics devices and methods, and in particular to landing safety avionics.

BACKGROUND OF THE INVENTION

Despite advances in flight safety technology, aircraft continue to encounter a phenomenon known as the "last mile," wherein the pilots who have successfully overcome the obstacles presented by flight through congested airspace, storms, and terrain, crash during the last mile of flight. This is often the result of the pilot transitioning from flight by reference to instruments inside the cockpit to using visual scanning outside the cockpit, often as the result of a circling approach at night or in marginal visibility conditions. While dealing with these challenges, pilots often have to use experience and a well-developed sense of "feel" for proper speed and glideslope management, especially at airfields lacking precision instrument approaches or visual glideslope indicators. An additional challenge is presented to those aircraft that have the benefits of many modern aircraft, yet lack the different complex sensor systems that might prevent mishaps such as landing short, long or fast. The advent and proliferation of Global Positioning System (GPS) technology represents a low-cost, low-technology solution to some of these problems, but is ineffective in eliminating the common "last mile" hazards.

One commercial product, the Enhanced Ground Proximity Warning System® (EGPWS) available from Honeywell International, Incorporated of Redmond, Wash. provides excellent protection for aircraft in the en-route and terminal environments, especially for recent generation Air Transport category aircraft that already contain a wide range of complex sensors. However, despite the complex data concentration and collision avoidance algorithms of the EGPWS, crashes still occur during circling or visual approaches when the aircraft is within 1–2 miles of the intended runway and on a visual or non-precision approach. The protection provided by the EGPWS is restricted by the manner in which the terrain floor and step-down airspace limitations in the vicinity of the runway are computed. The EGPWS computations include assumptions that reduce terrain avoidance protection for aircraft within one mile of the runway. Such assumptions may leave insufficient protection during abnormal approaches, for example, when an ILS straight-in approach has not been established.

Also, although EGPWS can provide significant safety benefits to pilots in the approach phases, even in the systems designed for low-end general aviation aircraft may be prohibitively expensive for many small general aviation aircraft. The current installed cost of such a safety system is approximately ⅓ of the hull value of many of these piston aircraft, which makes installation of the equipment impractical. The result is that, although small piston aircraft have the highest incidence of landing accidents due to excessive sink rates, overshot landings, and runway misalignment, these aircraft are denied the benefits of modern safety avionics.

Thus, despite advances in the performance of safety avionics, the art still fails to specifically address the hazards associated with the final landing phase of flight.

SUMMARY OF THE INVENTION

The present invention is a warning system to compute, detect and display the exceeding of parameters such as descent angle, rate of descent, line-up, insufficient runway remaining after touchdown, and excessive energy on approach.

According to one aspect of the invention, the present invention provides a means for determining a terminal flight path correspondence or deviation, including: a means for receiving a plurality of navigation signals; a means for determining a current position as a function of the navigation signals; a means for determining an Intended Touchdown Point; a means for determining a Current Touchdown Point; a means for determining correspondence between the Current Touchdown Point and Intended Touchdown Point; and a means for outputting a signal representative of the correspondence between the Current Touchdown Point and Intended Touchdown Point.

According to another aspect of the invention, the means for determining a Current Touchdown Point also includes means for comparing subsequent navigation signals as a function of elapsed time between the subsequent navigation signals.

According to another aspect of the invention, the means for determining a Current Touchdown Point also includes determining a rate of descent.

According to another aspect of the invention, the means for determining a terminal flight path correspondence or deviation also includes a means for retrieving a runway altitude information from a database of airport information, and the means for determining a Current Touchdown Point includes determining an intersection with the runway.

According to another aspect of the invention, the means for determining a Intended Touchdown Point also includes a means for determining a glide path to the Intended Touchdown Point position, the means for determining a Current Touchdown Point includes a means for determining an actual glide path as a function of one or more of the navigation signals, and the means for determining correspondence between the Current Touchdown Point and Intended Touchdown Point includes a means for determining deviation of the actual glide path from the glide path to the Intended Touchdown Point position.

According to another aspect of the invention, the means for outputting a signal representative of the correspondence between the Current Touchdown Point and Intended Touchdown Point also includes a means for generating one or more of an audio and a video signal. The means for generating a video signal optionally includes means for generating one or more of a signal representative of a deviation of a forward Current Touchdown Point from the Intended Touchdown Point and a signal representative of a deviation of a lateral Current Touchdown Point from the Intended Touchdown Point. The means for determining a terminal flight path correspondence or deviation may also include means for displaying the video signal.

According to another aspect of the invention, the means for determining a terminal flight path correspondence or deviation includes a means for receiving a plurality of different aircraft data signals, and the means for determining a Current Touchdown Point includes a means for determining the Current Touchdown Point as a function of the aircraft data signals.

According to another aspect of the invention, the means for determining a terminal flight path correspondence or deviation includes a means for receiving a one or more data signals representative of atmospheric conditions, and the means for determining a Current Touchdown Point includes a means for determining the Current Touchdown Point as a function of the atmospheric data signals.

According to another aspect of the invention, the invention provides a terminal flight path deviation generator having: a stored database of airport runway location and elevation information accessible as a function of position; a processor coupled to receive aircraft position and elevation data and coupled for retrieving the airport information from the database as a function of the aircraft position data, the processor being structured to operate a computer program for generating a Current Touchdown Point position, comparing the Current Touchdown Point position to a predetermined Intended Touchdown Point position, and generating a signal representative of deviation of the Current Touchdown Point position from the predetermined Intended Touchdown Point position; and a cockpit warning indicator being coupled to receive the deviation signal and being structured to generate a warning as a function of the deviation signal.

According to another aspect of the invention, the processor portion of the terminal flight path deviation generator of the invention is further structured to operate a computer program for generating the Intended Touchdown Point position.

According to another aspect of the invention, the cockpit warning indicator portion of the terminal flight path deviation generator is an audio annunciation device, and a visual display device, or both.

According to another aspect of the invention, the processor portion of the terminal flight path deviation generator of the invention is further structured to operate a computer program for determining runway direction information. The processor portion is optionally further structured to operate a computer program for generating an ideal glideslope to the Intended Touchdown Point position and to operate a computer program for determining deviation of an actual track from the ideal glideslope to the Intended Touchdown Point position. According to another aspect of the invention, the cockpit warning indicator portion of the terminal flight path deviation generator of the invention is a visual display device having a horizontal display portion for indicating a lateral deviation of the Current Touchdown Point position from the Intended Touchdown Point position. Optionally, the cockpit visual display device includes a ladder indicator for indicating deviation of the Current Touchdown Point position from the Intended Touchdown Point position.

According to another aspect of the invention, the processor portion of the terminal flight path deviation generator of the invention is further coupled to receive aircraft performance data, and is further structured to operate a computer program for generating a Current Touchdown Point position as a function of the aircraft performance data.

According to yet another aspect of the invention, the invention provides a method for using an electronic circuit to compare a signal conveying Current Touchdown Point data with a predetermined Intended Touchdown Point, the method including: receiving a plurality of navigation signals; retrieving runway information from a database as a function of one or more of the navigation signals; determining a Current Touchdown Point relative to a runway as a function of the navigation signals; determining an Intended Touchdown Point relative to the runway as a function of the runway information; determining deviation of the Current Touchdown Point from the Intended Touchdown Point; and outputting a signal representative of the deviation of the Current Touchdown Point from the Intended Touchdown Point.

According to another aspect of the method of the invention, the method includes receiving a plurality of aircraft performance signals, and the portion of the method for determining a Current Touchdown Point includes determining the Current Touchdown Point as a function of the aircraft performance signals.

According to another aspect of the invention, the method additionally includes: determining a runway length; determining a safe stopping distance after the Intended Touchdown Point; determining deviation of the safe stopping distance and the runway length; and outputting a signal representative of the deviation of the safe stopping distance and the runway length.

According to another aspect of the invention, the method of the invention may include receiving a plurality of atmospheric condition signals, and determining the Current Touchdown Point as a function of the atmospheric condition signals.

According to another aspect of the method of the invention, determining deviation of the Current Touchdown Point from the Intended Touchdown Point includes determining both a forward and a lateral deviation of the Current Touchdown Point from the Intended Touchdown Point. Optionally, the method of the invention includes generating a display representative of both the forward and lateral deviations of the Current Touchdown Point from the Intended Touchdown Point. Optionally, determining an Intended Touchdown Point relative to the runway includes determining a preferred glide path, determining a Current Touchdown Point relative to the runway includes determining an actual glide path, and determining deviation of the lateral deviation of the Current Touchdown Point from the Intended Touchdown Point includes determining deviation of the actual glide path from the preferred glide path.

According to another aspect of the invention, the invention is embodied in a computer program product for configuring an avionics device, the computer program product including a computer-usable medium having computer-readable code embodied therein for configuring a computer processor. The computer program product of the invention includes: computer-readable code configured to cause a computer processor to retrieve from storage on a computer-readable medium a set of airport information data; computer-readable code configured to cause a computer processor to determine an Intended Touchdown Point as a function of the airport information data; computer-readable code configured to cause a computer processor to access a set of aircraft position information; computer-readable code configured to cause a computer processor to determine a current aircraft position as a function of the set of aircraft position information; computer-readable code configured to cause a computer processor to determine a Current Touchdown Point as a function of the aircraft's current position; and computer-readable code configured to cause a computer processor to determine a correspondence of the Current Touchdown Point and Intended Touchdown Point, and to generate an output signal as a function of the correspondence.

According to different aspects of the invention, the computer program product also includes computer-readable code configured to cause a computer processor to generate a real-time instantaneous correspondence indication as a function of the correspondence signal. The output signal generated as a function of the correspondence of the Current Touchdown Point and Intended Touchdown Point may include a warning indication signal generated as function of the real-time instantaneous correspondence exceeding a maximum permissible deviation.

According to another aspect of the invention, the computer program product includes computer-readable code configured to cause a computer processor to determine a current glide path as a function of a plurality of subsequent sets of aircraft position information. The computer program product also includes computer-readable code configured to cause a computer processor to determine a correspondence of the current glide path and a predetermined glide path and to generate an output signal as a function of the correspondence.

According to another aspect of the invention, the computer program product of the invention further includes computer-readable code configured to cause a computer processor to access a set of aircraft performance data; and the computer-readable code configured to cause a computer processor to determine the Current Touchdown Point includes computer-readable code configured to cause a computer processor to determine the Current Touchdown Point as a function of the aircraft performance data. The computer program product also includes computer-readable code configured to cause a computer processor to determine flightpath energy as a function of the aircraft performance data, and computer-readable code configured to cause a computer processor to determine a correspondence of the flightpath energy and the set of airport information data and to generate an output signal as a function of the correspondence.

According to another aspect of the invention, the computer program product also includes computer-readable code configured to cause a computer processor to access a set of current atmospheric data; and the computer-readable code configured to cause a computer processor to determine the Current Touchdown Point includes computer-readable code configured to cause a computer processor to determine a Current Touchdown Point as a function of the current atmospheric data.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 9 illustrates a situation where the Current Touchdown Point (CTP) and Maximum Touchdown Point (MTP) are both significantly short of the runway threshold and the Intended Touchdown Point (ITP);

FIG. 10 illustrates the prior art algorithmic estimate of the Current Touchdown Point (CTP);

FIG. 13 illustrates the terminal flight path determination of the invention as embodied in a set of machine instructions received and operated by an alternative onboard avionics apparatus;

FIG. 14 illustrates an angle of attack indicator of the current art installed on most military and some civilian aircraft;

FIGS. 15–20 illustrate the present invention embodied in a display that provides visual indication of glidepath errors, flightpath energy management errors, and lateral line-up errors, wherein:

FIG. 15 illustrates the display indication that the Current Touchdown Point (CTP) coincides with the ITP and that the aircraft of FIG. 1 is correctly lined up with respect to the runway centerline.

FIG. 16 shows the display of the invention having a single centerline or lateral glidepath indicator triangle that is positioned at the center of a horizontal block and is neutrally colored (not shown) to indicate that the current lateral line-up is within acceptable limits, and a relative CTP position indicator block that is positioned above the vertical center of the glidepath indicator to indicate that the CTP position deviates from the ITP position and the aircraft is landing long, beyond the ITP;

FIG. 17 shows the display of the invention having the relative CTP position indicator block positioned significantly below the vertical center of the glidepath indicator to indicate that the CTP position is short relative to the ITP position so that the aircraft will land significantly short of the runway threshold and the ITP, and the single centerline or lateral glidepath indicator triangle is positioned off (left) of the center of the horizontal block but is still neutrally colored (not shown) to indicate that the aircraft is currently laterally lined-up for a touchdown point outside of acceptable limits;

FIG. 18 shows the display of the invention having the single centerline or lateral glidepath indicator triangle positioned at the center of the horizontal block and being neutrally colored (not shown) to indicate that the current lateral line-up is within acceptable limits, the relative CTP position indicator block is positioned slightly above the vertical center of the glidepath indicator to indicate that the CTP position deviates slightly from the ITP position and the aircraft is landing long, beyond the ITP, and the normally neutral colored relative CTP position indicator block is changed to either a warning or a danger color (color not shown) flashes to draw visual attention and indicate that the aircraft has too much energy to land in the length of runway remaining beyond the estimated CTP;

FIG. 19 illustrates the display of the invention depicting a situation where the aircraft of FIG. 1 is correctly aimed at the ITP but is lined up well off centerline so that a lateral glidepath indicator positioned at either extreme of the lateral glidepath indicator block is illuminated having either a warning color or a danger color, others of the warning and danger signals are illuminated in this illustration solely to show the different colors and positions of all the segments.

FIG. 20 illustrates the display of the invention that provides visual indication of glidepath errors and lateral line-up errors when the aircraft is correctly aimed at the ITP and centerline, but the neutrally colored opposed triangular center datum indicators on either side of the tapered indicator are changed to a danger color (color not shown) and are flashing or otherwise drawing visual attention to indicate that the current glidepath exceeds a pre-programmed descent profile limitations, such as descent angle or vertical speed.

DETAILED DESCRIPTION OF PREFERRED EMBODIMENT

In the Figures, like numerals indicate like elements.

The present invention is a method, avionics apparatus and computer program product for determining a terminal flight path. The method includes access to aircraft position information such as latitude, longitude and altitude data provided by an on-board Global Positioning System (GPS) receiver and an optional Wide Area Augmentation System (WAAS). The optional WAAS receiver provides highly accurate altitude information and other GPS signal corrections. The method determines an Intended Touchdown Point (ITP), which is the latitude, longitude and mean sea level (MSL) altitude coordinates of the pilot's desired location to land on an intended runway; determines a Current Touchdown Point (CTP), which is where the aircraft will land given its current glidepath and is a function of the current trajectory, configuration and engine thrust; determines a correspondence of the CTP and ITP and generates an output signal as a function of the correspondence. According to one or more alternative embodiments, the method of the invention generates a real-time instantaneous correspondence indication as a function of correspondence signal and indicates the correspondence of the CTP and ITP by displaying the indication on a cockpit display device, annunciating the indication on a cockpit speaker, or both. According to one or more alternative embodiments, the method of the invention further includes generating a warning indication as function of the correspondence of the CTP and ITP exceeding a maximum permissible deviation and one or both displaying and annunciating the warning indication.

Figure 1:
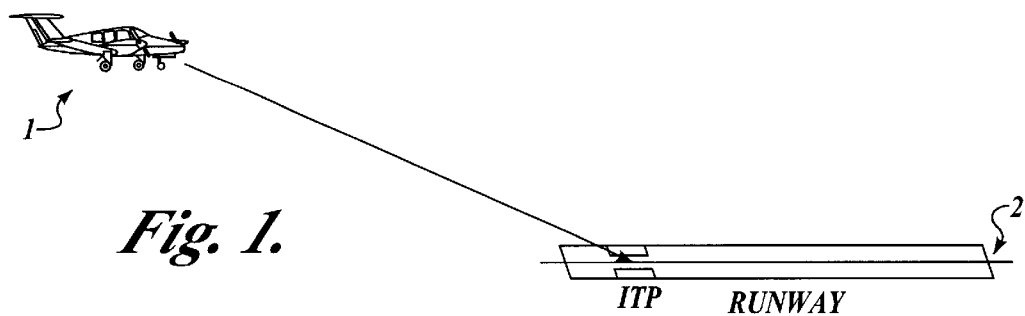
FIG. 1 illustrates an aircraft that is correctly lined up for the Intended Touchdown Point (ITP) and aligned with runway centerline.
Figure 2:
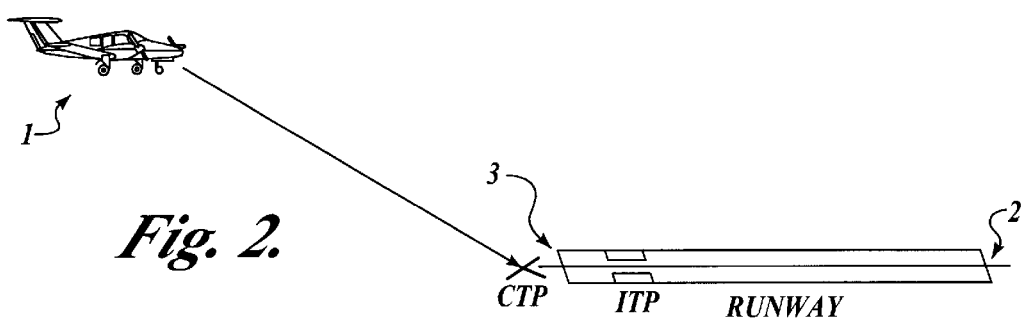
FIG. 2 illustrates the aircraft of FIG. 1 with a Current Touchdown Point (CTP) that is short of the runway threshold.
Figure 3:
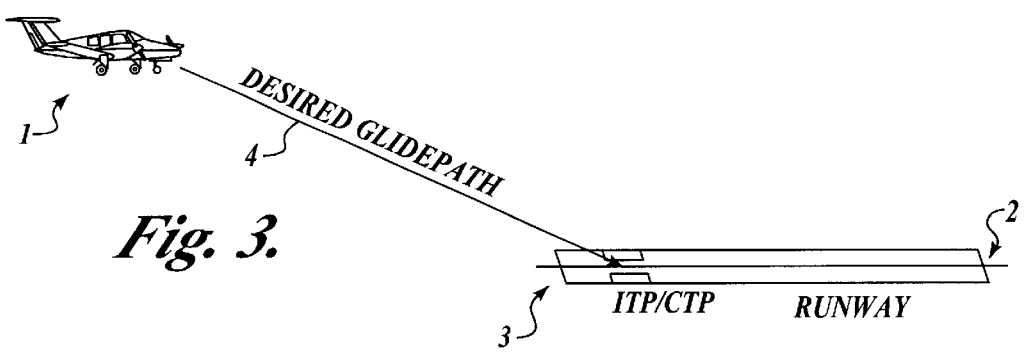
FIG. 3 illustrates the aircraft of FIG. 1 having acquired the desired glidepath to the runway centerline wherein the Current Touchdown Point (CTP) coincides with the Intended Touchdown Point (ITP)
Figure 4:
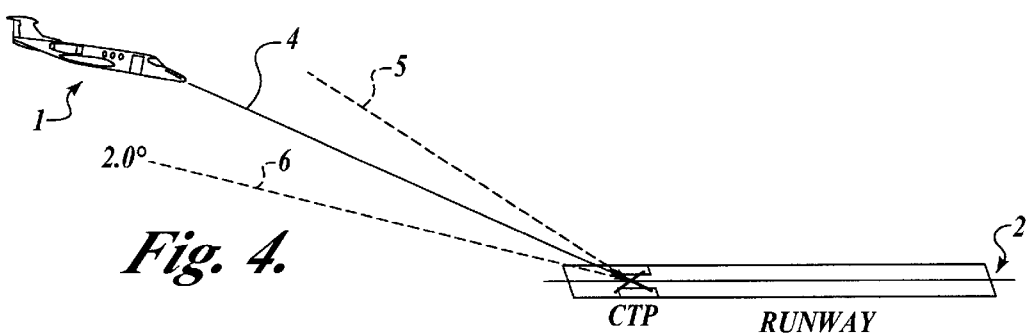
FIG. 4 illustrates the aircraft of FIG. 1 correctly lined up for the Intended Touchdown Point (ITP) and the runway centerline within the predetermined upper and lower glidepath bounds.

FIG. 1 illustrates an aircraft 1 that is correctly lined up for the Intended Touchdown Point and aligned with runway centerline 2. FIG. 2 illustrates the aircraft 1 of FIG. 1 with a forward Current Touchdown Point that is short of the runway threshold 3. FIG. 3 illustrates the aircraft 1 of FIG. 1 having acquired the desired glidepath 4 to the runway centerline 2 wherein the forward Current Touchdown Point (CTP) coincides with the Intended Touchdown Point (ITP). FIG. 4 illustrates the aircraft 1 correctly lined up for the Intended Touchdown Point and the runway centerline 2 within the permissible upper and lower glidepath bounds 5, 6. For commercial aircraft, the maximum range of the desired glidepath 4 is approximately 2.0 to 4.5 degrees at a maximum descent rate of 300 feet per minute.

Figure 5:
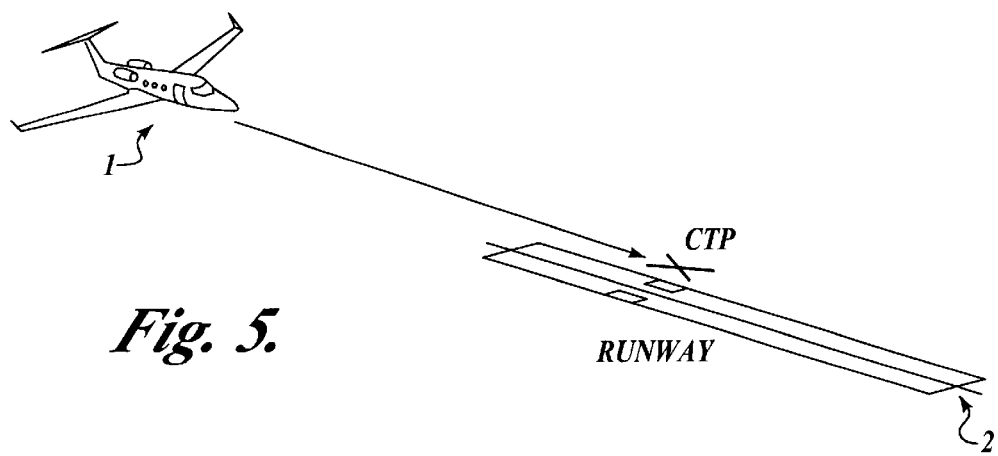
FIG. 5 illustrates the aircraft 1 of FIG. 1 on an approach having its Current Touchdown Point (CTP) off of the centerline.
Figure 6:
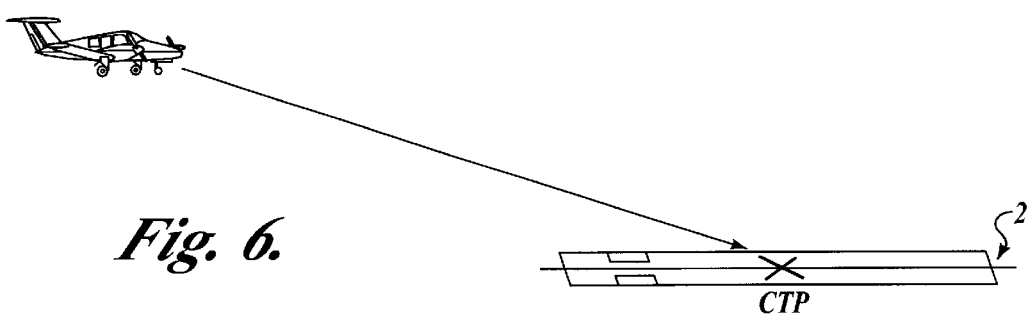
FIG. 6 illustrates the case where the Current Touchdown Point (CTP) of the aircraft of FIG. 1 is too far past the Intended Touchdown Point (ITP), which indicates the aircraft has too much energy for a safe landing.

FIG. 5 illustrates the aircraft 1 on an approach having its forward CTP off of the centerline 2. FIG. 6 illustrates the case where the forward CTP of the aircraft 1 is too far past the ITP, which indicates the aircraft has too much energy for a safe landing. As will be readily understood, an aircraft's actual and intended touchdown points are key to safety. If an aircraft lands short of the runway, as illustrated in FIG. 2, off the runway, as illustrated in FIG. 5, or even if it lands on the runway but too far past the threshold to allow a successful stop in the remaining length of runway, as illustrated in FIG. 6, the safety of the aircraft, passengers and crew may be jeopardized.

The Maximum Touchdown Point (MTP) is the "Best Case" touchdown point, which is the farthest point along the runway that the aircraft can reach given its current configuration and engine performance settings. If the Maximum Touchdown Point is closer than the ITP, then the plane cannot reach the ITP, unless power is increased, bank angle is decreased, or the Coefficient of Lift ($C_L$) is increased. On a normal safe approach, the MTP is well beyond both the ITP and the CTP.

Figure 7:
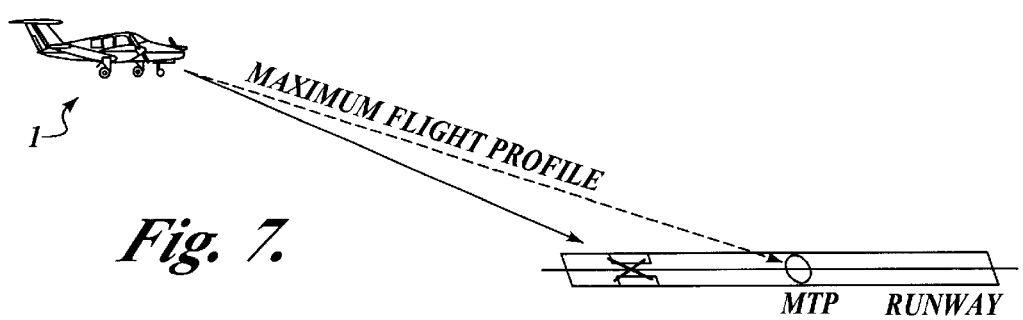
FIG. 7 illustrates the Maximum Touchdown Point (MTP) which is attainable when the aircraft flies its Maximum Flight Profile (MFP) given its current configuration and performance.
Figure 8:
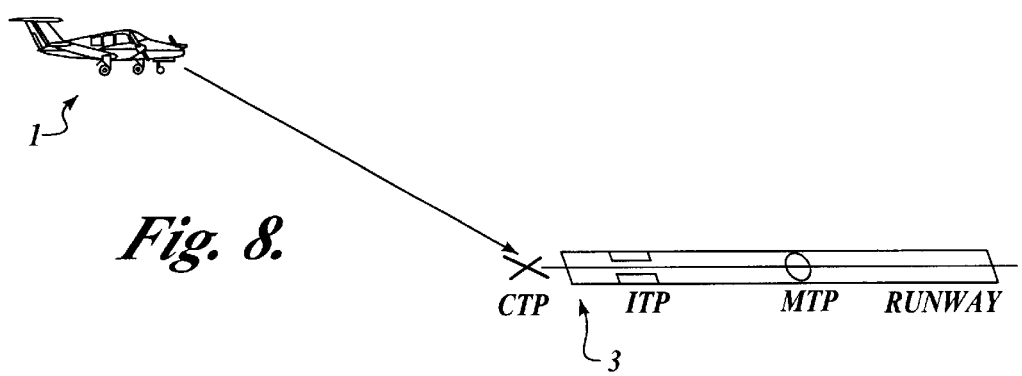
FIG. 8 illustrates a situation where the aircraft of FIG. 1 is flown to a Current Touchdown Point (CTP) significantly short of both the runway threshold and the Intended Touchdown Point (ITP) despite having sufficient performance capability to reach a Maximum Touchdown Point (MTP) well beyond the ITP.

FIG. 7 illustrates the Maximum Touchdown Point which is attainable when the aircraft 1 flies its Maximum Flight Profile (MFP) given its current configuration and performance. The aircraft can only fly its Maximum Flight Profile (MFP) when no atmospheric conditions operate against it. FIG. 8 illustrates a situation where the aircraft 1 is deterred from flying its Maximum Flight Profile (MFP) (shown in FIG. 7) to the extent that the forward CTP is significantly short of both the runway threshold 3 and the ITP. This is a situation that results when atmospheric conditions operate against the aircraft. FIG. 9 illustrates a situation where the forward CTP and MTP are both significantly short of the runway threshold 3 and the ITP. Thus, even under the best conditions, the aircraft 1 cannot reach the ITP, unless power is increased, bank angle is decreased, or the $C_L$ is increased.

The present invention solves the problem of safely landing the aircraft at the ITP by providing to the pilot information about the aircraft's trajectory and how variations in its flight profile will affect the actual landing point. By computing the Current Touchdown Point and comparing it to the Intended Touchdown Point, the invention then informs the pilot of dangerous trends so that corrections may be made and accidents avoided.

In the practice of the present invention, a pilot selects a point on the runway for landing, and then aims the approach to arrive at this Intended Touchdown Point (ITP). Under Visual Flight Rules (VFR) operations, selection of the Intended Touchdown Point is at the pilot's discretion, and is limited only to the extent that it must be located such as to permit the aircraft to land safely and come to a complete stop within the remaining runway length. Runways having a published instrument approach are typically marked with a Touchdown Zone and an Aiming Point, the latter being located approximately 1,000 feet after the runway threshold. Both the Visual Flight Rules and Instrument Flight Rules Intended Touchdown Points can be defined by latitude, longitude, and mean sea level (MSL) altitude coordinates.

The location of the ITP is obtained by a number of different means, including: direct storage of latitude and longitude location coordinates as part of a stored runway database, derivation based on a predetermined offset retrieved from a stored database of approach threshold locations, or pilot selection of location based on offset from a stored database of approach threshold locations.

FIG. 10 illustrates the simplistic prior art algorithmic estimate of the forward CTP using only a current position, relative altitude and horizontal distance to the ITP. The simplistic prior art algorithm for estimating the forward CTP included estimating an Aircraft Relative Altitude, an Estimated Time to landing, and an Estimated Horizontal Distance to Landing, according to the following:

Aircraft Relative Altitude=Aircraft Altitude—Runway Elevation;

Estimated Time to landing=Relative Altitude/Vertical Speed;

Estimated Horizontal Distance to Landing= Groundspeed×Estimated Time to Landing.

The present invention provides a real-time computation for determining the aircraft's Current Touchdown Point, and for determining its relationship to the Intended Touchdown Point. One means of communicating this information is to annunciate warnings to the pilot aurally to avoid interrupting the pilot's concentration during approach. The information permits the pilot to adjust the current glidepath by adjusting different aircraft performance data factors: configuration, engine thrust, and trajectory, to conform the aircraft's Current Touchdown Point to the Intended Touchdown Point. Safety is thus enhanced, accidents are prevented, and lives will be saved.

Figure 11:
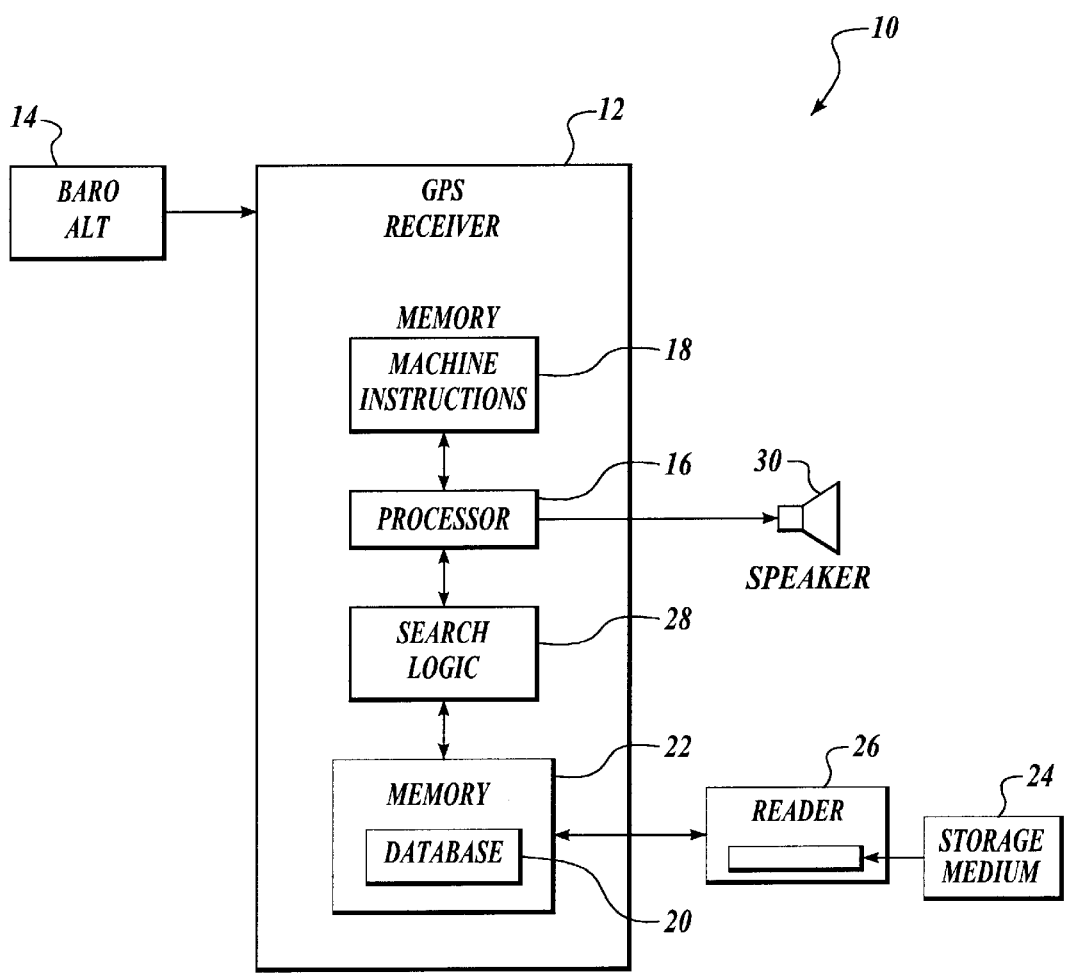
FIG. 11 illustrates by example and without limitation the terminal flight path determination of the invention as embodied in an avionics apparatus.

FIG. 11 illustrates by example and without limitation the terminal flight path determination of the invention as embodied in an avionics apparatus 10. According to one embodiment of the avionics apparatus 10, the aircraft's current position in terms of latitude, longitude, and altitude are derived from an onboard GPS receiver 12. Barometric altitude may also be provided by an onboard source 14.

The onboard GPS receiver 12 includes a computer processor portion 16 having inputs coupled to a non-volatile memory 18 to receive a plurality of machine instructions stored therein. The processor 16 retrieves and operates the machine instructions, whereby the processor 16 operates an algorithm, such as the prior art algorithmic estimate described herein, for rapidly and easily computing the aircraft's forward Current Touchdown Point.

The processor 16 operates the algorithm to compute the aircraft's current groundspeed as the difference between of subsequent or consecutive latitude and longitude positions divided by the intervening time, and computes the aircraft's current vertical speed as the difference between of subsequent or consecutive altitude values divided by the intervening time. Using the current groundspeed and vertical speed, the algorithm is operated to compute the aircraft's real-time near-instantaneous flight path vector. According to the present invention, a database 20 stored in a non-volatile memory portion 22 of the GPS includes stored runway information, including runway coordinates and elevation MSL data for a number of runways. The database 20 is alternatively stored on a portable computer-readable medium 24, such as a compact disc (CD) or floppy diskette, and read in via a media reader 26 coupled to the GPS processor 16 via an I/O port. A known location search logic device 28 is coupled between the memory 22 and the processor 16 for accessing the database 20 as a function of the aircraft's latitude and longitude position. The algorithm of the invention is further operated to retrieve the stored runway elevation MSL data for the current runway and computes the forward CTP by determining where the aircraft's current flight path vector intercepts the runway's surface. The algorithm of the invention may be further operated to compute supporting data, including the Aircraft Relative Altitude, the Estimated Time to landing, and the Estimated Horizontal Distance to Landing, as described herein.

The ITP location is obtained by one of a number of different means. According to one embodiment of the invention, latitude and longitude location coordinates are retrieved from a runway database stored in the onboard database 20. According to another embodiment of the invention, the ITP location is derived by operating the algorithm of the invention to apply a predetermined offset to approach threshold latitude and longitude location data retrieved from a database of approach threshold locations stored in the onboard database 18. According to still another embodiment of the invention, the ITP location is a pilot selected location determined by operating the algorithm of the invention to apply a pilot selected offset to the approach threshold location data retrieved from the stored database of approach threshold locations.

The algorithm of the invention is operated by the processor 16 to compare the forward CTP with the ITP and generate a signal as a function of the difference. In order to ensure a safe landing the CTP must coincide with the ITP within predetermined limits safety limits. If the aircraft's real-time forward CTP deviates from the ITP by more than a maximum safe deviation, a warning indication is generated and annunciated over an audio system 30. For example, an appropriate aural alert is annunciated to the flight crew to indicate that a hazards exists. For example, according to one embodiment of the invention, aural alerts are provided to the flight crew to indicate that any of the previously described deviations or hazards exist. According to another embodiment of the invention, aural warning are provided that advise of a potential solution to avoid the described deviations or hazards. The avionics apparatus 10 provides cognitively simple aural warnings, such as "Add Power" or "Reduce Speed," as appropriate.

According to still another embodiment of the invention, the algorithm of the invention is operated by the processor 16 to compute a current Track of the aircraft, i.e., the actual path over the ground traveled by the aircraft. The algorithm is further operated to retrieve the runway direction or path from the database 20 of stored runway information. The algorithm compares the Track with the runway direction or path and generate a signal as a function of the difference. In order to ensure a safe landing the Track must coincide or line-up with the runway within predetermined limits safety limits. If the aircraft's real-time Track deviates from a preferred or "ideal" glide path to the runway by more than a maximum safe deviation, a warning indication is generated and annunciated over the audio system 30. For example, an appropriate aural alert is annunciated to the flight crew to indicate that a hazards exists. According to one embodiment of the invention, aural warning are provided that advise of a potential solution to correct the situation, such as "Port" or "Starboard," as appropriate.

Additional Embodiments

As discussed above, different grades of the method of the invention for determining a terminal flight path, the avionics apparatus of the invention, and the computer program product implementing the method of the invention are appropriate for different grades of aircraft. Therefore, the present invention includes a range of solutions that fit within the cost/benefit tradeoffs of the different grades of General Aviation, Air Transport and Business Aviation aircraft. The different embodiments of the invention therefore include a range of solutions that address the differences in existing sensors, navigation equipment, and display solutions typical of this range of aircraft grades.

An aircraft's ability to actually arrive at the ITP is a function of several different aircraft data factors, including aircraft configuration, i.e., the configuration of its gear, flaps, spoilers, and speedbrakes; engine thrust, which is a function of the aircraft's available power plant as well as the current power setting; and trajectory, which is determined by $$HDLAF_{MAX} = \int_{Runway\,Altitude}^{Aircraft\,Altitude} (L/D_{MAX\,CONFIG} + Drift_{WIND} + Density_{AIR} + Bank\,Angle_{0\,DEGREES})\,dt,$$

selected descent angle, True Airspeed (TAS), wind Speed and gradient, density altitude, aircraft weight, and bank angle. A pilot sets up the approach to account for these data factors and arrive safely at the Intended Touchdown Point. However, a pilot's ability to actually arrive at the ITP is a function of the effect of the aircraft's performance parameters on its ability to conform to the approach set up by the pilot.

Figure 12:
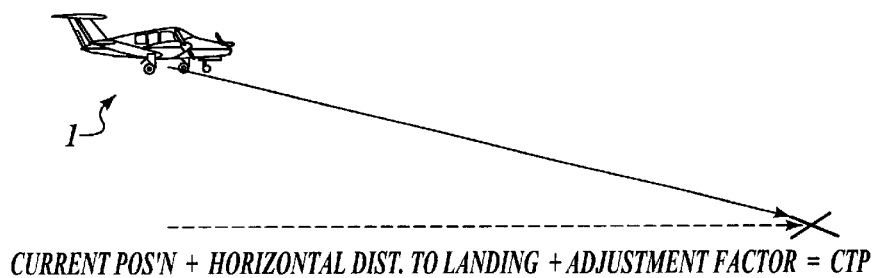
FIG. 12 illustrates the present invention embodied in an algorithm for accurately estimating the Current Touchdown Point (CTP) by including an adjustment factor in addition to the current position, relative altitude and horizontal distance to the Intended Touchdown Point (ITP) used in the prior art estimate.

FIG. 12 illustrates the present invention embodied in an algorithm for accurately estimating the forward CTP by using an adjustment factor in addition to the current position, relative altitude and horizontal distance to the ITP used in the prior art estimate, as discussed above. Using this information, the aircraft's near-instantaneous flight path vector can be rapidly and easily computed as a function of the aircraft's current configuration, engine thrust, trajectory, and prevailing atmospheric conditions.

By accounting for the effect of these factors, an accurate glidepath model is generated in real time. To achieve this accurate glidepath model, increasing levels of sophistication for on-board systems are used, including by example and without limitation: Air Data Computers; Flight Management Systems with performance data such as gear, flap and speedbrake position sensors; and thrust sensors or look-up tables providing thrust characteristics. The Horizontal Distance to Landing computed using the simplified prior art algorithm is affected by: landing configuration, drift due to prevailing wind, air density, and bank angle. A Horizontal Distance to Landing Adjustment Factor (HDLAF) is computed to account for these factors according to the following:

$$HDLAF = \int_{Runway\,Altitude}^{Aircraft\,Altitude} (L/D_{CONFIG} + Drift_{WIND} + Density_{AIR} + Bank\,angle)\,dt,$$

where the landing configuration ($L/D_{CONFIG}$) is given by:

$L/D_{CONFIG} = f(Drag_{Drag\,Gear\,Position+Drag\,Flap\,Position+Drag\,Speedbrake\,Position} + Thrust_{Current})$.

In other words, the Lift-to-Drag Coefficient ($L/D_{CONFIG}$) is a function of the aircraft's current coefficients of drag and thrust, where the drag coefficient is a function of the drag produced by the current gear, flap and speedbrake positions.

The integral of the above equation indicates that the actual Horizontal Distance to Landing Adjustment Factor is the sum of the effects over the entire flight path between the aircraft's current altitude and the runway, taken in infinitesimally small increments.

According to one embodiment of the invention, the Maximum Touchdown Point is computed, where the MTP is the farthest point along the runway where the aircraft can touch down given its current configuration and performance. As discussed above, if the Maximum Touchdown Point is closer than the ITP, the plane will be short of the ITP unless power is increased, bank angle is decreased, or the $C_L$ is increased. A maximum Horizontal Distance to Landing Adjustment Factor ($HDLAF_{MAX}$) is computed according to:

where:

$L/D_{MAX\,CONFIG} = f(Drag_{Drag\,Gear\,Position+Drag\,Flap\,Position+Drag\,Speedbrake\,Position} + Thrust_{Current})$.

While the maximum Lift-to-Drag ratio ($L/D_{MAX\,CONFIG}$) equation used in computing the maximum Horizontal Distance to Landing Adjustment Factor ($HDLAF_{MAX}$) is the same as the Lift-to-Drag Coefficient ($L/D_{CONFIG}$) used in computing the Horizontal Distance to Landing Adjustment Factor (HDLAF) given above, these are two different L/D ratios: $L/D_{CONFIG}$ is the lift-to-drag ratio for a current aircraft configuration, and $L/D_{MAX\,CONFIG}$ is a maximum possible lift-to-drag ratio that could be achieved by an aircraft having a given configuration. For example, with the flaps and gear down flying at an approach speed, a commercial transport might have an $L/D_{CONFIG}$ of a first value, but by slowing down, which in effect changes the aircraft's angle of attack, the $L/D_{MAX\,CONFIG}$ can be achieved and result in the L/D value increasing to a substantially larger value. The maximums Horizontal Distance to Landing Adjustment Factor ($HDLAF_{MAX}$) thus achieved is substantially greater than the Horizontal Distance to Landing Adjustment Factor (HDLAF) achieved based on the first value, $L/D_{CONFIG}$.

FIG. 13 illustrates the terminal flight path determination of the invention as embodied in a set of machine instructions received and operated by another onboard avionics apparatus 100. The machine instructions include instructions for receiving data from one or more of the instrument information signals available on either an aircraft data bus 102 or another suitable means for providing real-time electronic signal data source of instrument signals reporting flight parameter information provides the various signals to the integrated terminal flight path determination system 100 of the invention. A detailed description of the signals available on an aircraft data bus 102 is provided by the ARINC Characteristic 429 as published by Aeronautical Radio, Incorporated of Annapolis, Md., the entirety of which is incorporated herein by reference. Included among the signals provided by the aircraft data bus 102 or other suitable source are signals useful for operating the terminal flight path determination system 100 of the invention, these signals including by example and without limitation: navigation signals including GPS altitude, course, heading, latitude and longitude signals, Wide Area Augmentation System (WAAS) signals and Local Area Augmentation System (LAAS) signals; barometric and radio altitude signals; a vertical speed signal; an air speed signal; flap, spoiler, and gear position signals; pitch indicator signals; a bank angle signal; a speedbrake signal; engine performance data signals, including thrust sensors; and atmospheric data signals, including wind, density and altitude signals.

These signals are used as inputs to an integrated terminal flight path determination circuit, which in turn is effective to generate an integrated plurality of annuciator and display control signals informing the different aural and visual display presentations of the invention. The integrated plurality of annuciator and display control signals are applied to respective annuciator and display generators, that in turn generate a plurality of annuciator and display control signals that result in aural warnings being annunciated on cockpit speakers and terminal flight path symbology being displayed on a cockpit display, as described below.

According to one embodiment of the avionics apparatus 100, an onboard memory 104 stores the machine instructions and an onboard processor 106 is coupled for receiving and operating the machine instructions. The computer processor 106 is by example and without limitation a microprocessor, a digital signal processor, or another suitable processor and may be either a dedicated processor or a processor shared with other onboard equipment. The processor 106 includes inputs coupled to the onboard memory 104 to the receive machine instructions and inputs coupled to the data bus 102 to receive sources of instrument signals reporting flight parameter information. The processor 106 uses data received from a navigation system 108 on the aircraft to provide current information about the aircraft's current latitude, longitude and altitude position, as well as current course and heading. The navigation data may be obtained directly from the navigation system, which may include an inertial navigation system, a satellite navigation receiver such as a WAAS capable GPS receiver, or both.

One embodiment of the present invention provides a WAAS capable GPS receiver. WAAS technology provides sufficient vertical accuracy that many of the calculations necessary for representing glideslope and Intended Touchdown Point that the aircraft's static altimeter inputs are unnecessary, and the corresponding inaccuracies are eliminated.

In addition, the invention uses software associated with the EGPWS that is commonly referred to as "runway picker" software. This software selects an intended runway for approach and landing without using the FMC Interface. When used in combination with a panel-mounted GPS, the EGPWS "runway picker" software enables calculations about landing intentions, even when the aircraft is circling to land. Use of the "runway picker" software reduces Controlled Flight Into Terrain (CFIT) risk at multiple runway airports when the possibility exists of landing short. One example is the LearJet incident on Houston Rwy 27R (1998). The GPS, WAAS and EGPWS "runway picker" technologies, when combined, enable additional safety protection for a wide range of aircraft, including the lowest General Aviation aircraft through the most modem Air Transport and Business Aviation planes.

Information about the barometric altitude, vertical speed and air speed of the aircraft are available from the navigation system 108, from an air data computer 110, or from a barometric altimeter and a barometric rate circuit present on the aircraft. The vertical speed may be expressed as a barometric rate, or as Z velocity, which may be obtained from an onboard inertial navigation system. Alternatively, the simulated visual glide path indicator system 100 utilizes altitude signals from a radio altimeter 112. The altitude signals are optionally geometric altitude signals generated by the computer processor 106 as a blended combination of the instantaneous GPS altitude signal and the barometric altitude signal as described by Johnson et al. in U.S. Pat. No. 6,216,064, entitled METHOD AND APPARATUS FOR DETERMINING ALTITUDE, which is owned by the assignee of the present application and the entirety of which is incorporated herein by reference. Methods and apparatus for determining altitude, specifically altitude in an aircraft, and an estimated error of the altitude are described in U.S. Pat. No. 6,216,064. The altitude determination preferably uses a first altitude based on hydrostatic calculations, including local pressure and temperature, as well as a second altitude which is preferably a GPS altitude. Radio altimetry can also be used instead of or as a complement to the GPS altitude. Other sources of altitude determination can be used in the equation for the calculation of the final altitude. Each of the sources of altitude determination is provided with a complementary estimated error. In the final determination of the probable altitude, each source of altitude information is preferably accorded a weighting according to the estimated error of the altitude source. For global positioning altitude, the final combination of the altitude sources uses a complementary filter which takes into account the selective availability of the GPS altitude. This accounts for the long-term accuracy but short-term inaccuracy of GPS altitude. Corrections are provided to account for horizontal changes in pressure gradient as the aircraft moves from an origin to a destination. The invention described in U.S. Pat. No. 6,216,064 further provides for the altitude to be corrected based on non-standard atmospheric temperature (ISA) variations. In operating the method of U.S. Pat. No. 6,216,064, the computer processor 106 and memory 104 are configured to receive the altitude information and make the necessary calculations to result in an estimate of the current altitude which is then made available to the different operations performed by the integrated display presentation system 100 of the invention. The computer processor 106 includes inputs to receive sources of altitude information.

Discrete signals from discretes 114, 116 and 136 indicate the position of the spoilers, flaps and landing gear, which indicate whether the aircraft is configured for landing, and discrete signals from a pitch indicator discrete 138 indicate the real time aircraft pitch angle. If available, signals from a localizer receiver 122 indicate whether the aircraft is on a correct course for a landing.

Signals from the autopilot system 124 may be used to control the aircraft's flight characteristics. A Flight Management System (FMS) 126 coupled to the data bus 102 has stored therein information about the intended course during the current flight, including information about the positions of waypoints along the aircraft's flight path.

These signals available on the data bus 102 are applied to the processor 106 for enabling the terminal flight path information system of the invention according to the different information presentation operations performed by the terminal flight path information system 100 of the invention.

A memory device 128 coupled to the processor 106 stores a plurality of data bases of information relevant to performance of the different operations of the invention. A location search logic device 130 is coupled between the memory device 128 and the processor 106 for accessing one of the data bases during performance of one or more of the different operations of the invention.

Using the data supplied by the different instrument and radio communication signals available on the data bus 102, the processor 106 operates one or more algorithms for generating the plurality of aural and display control signals illustrated herein and described in detail below. The aural and display control signals are output respectively to display and annunciation generators 132, 134 that interpret the aural and display control signal to generate the terminal flight path information aural and display information of the invention, as discussed herein.

The aircraft's current latitude, longitude, and altitude position are derived from the onboard GPS receiver 114. Barometric altitude may be used rather than the GPS altitude data. According to one embodiment of the avionics apparatus 100 of the invention, the GPS receiver 114 is WAAS capable, whereby WAAS technology provides sufficient vertical accuracy that many of the calculations necessary for representing glideslope and Intended Touchdown Point are avoided.

The onboard processor 106, which is either part of the onboard GPS receiver 114 or another onboard processor, operates an algorithm described herein for rapidly and easily computing the aircraft's Current Touchdown Point. As described herein, the algorithm operated by the processor 106 computes the aircraft's current groundspeed and vertical speed, which are combined to compute the aircraft's real-time near-instantaneous flight path vector.

The algorithm of the invention may be further operated to compute supporting data, including an Aircraft Relative Altitude, an Estimated Time to landing, and an Estimated Horizontal Distance to Landing, as discussed above.

According to the present invention, the non-volatile memory 128 coupled to the processor 106 stores a database 136 of runway elevation MSL data for a number of runways. The database 136 is alternatively stored on a portable computer-readable medium 138, such as a compact disc (CD) or floppy diskette, and read in via a media reader 140 coupled to the processor via an I/O port. The algorithm of the invention is further operated to retrieve the stored runway elevation MSL data for the current runway and computes the current CTP by determining where the aircraft's current flight path vector intercepts the runway's surface.

According to still another embodiment of the invention the algorithm of the invention is operated by the processor 106 to compute the actual path over the ground traveled by the aircraft, i.e., the current Track of the aircraft, as discussed above. The algorithm retrieves the runway direction or path from the database 136, compares the Track with the runway direction or path, and generates a signal as a function of the difference within predetermined limits safety limits. If the aircraft's real-time Track deviates from the runway by more than a maximum safe deviation, a warning indication is generated and annunciated over the audio system. As discussed above, an appropriate aural alert is annunciated to the flight crew to indicate that a hazards exists. According to one embodiment of the invention, aural warning are provided that advise of a potential solution to correct the situation, such as "Port" or "Starboard," as appropriate.

According to one embodiment of the invention, the different data factors affecting aircraft glidepath are compared to data derived from a stored look-up table of performance for the given aircraft type, and an approximation is made of the aircraft's actual descent path based on the planned descent path. Given the aircraft's current position and the approximation of the actual descent path, the CTP is determined.

As discussed above, FIG. 12 illustrates the present invention's estimate of the forward and lateral CTP, which is also computed as a function of the current position, relative altitude and horizontal distance to the ITP. But by contrast to the prior art estimate, the present invention computes the estimated Current Touchdown Point as a further function of an adjustment factor made up of several additional data factors, including the aircraft data factors: current trajectory, configuration, and engine thrust, as well as current atmospheric conditions. The present invention compares this more accurately estimated CTP to the Intended Touchdown Point and informs the pilot of dangerous trends away from the ITP so that the pilot can correct for them, thereby avoiding a mishap.

In the practice of the present invention, a pilot selects a point on the runway and flies the approach so as to land at the Intended Touchdown Point ITP. Under VFR operations, the ITP is completely at the pilot's discretion, but as discussed above, the ITP must be located such so as to allow a safe landing and stop in the available runway distance. According to one embodiment of the invention, the ITP is evaluated to ensure that its location relative to the runway is sufficient for the needs of the aircraft as a function of the current configuration, weight, density altitude and optionally the current atmospheric conditions. Cautions are provided if the ITP fails to meet safety criteria such as stopping distance.

The present invention provides a real-time computation for determining the aircraft's Current Touchdown Point, and for determining its relationship to the Intended Touchdown Point. The information is displayed in a manner that permits the pilot to view it even when concentrating on looking outside the cockpit. The displayed information permits the pilot to adjust the different aircraft data factors: configuration, engine thrust, and trajectory, to conform the aircraft's Current Touchdown Point to the Intended Touchdown Point. Safety is thus enhanced, accidents are prevented, and lives will be saved.

The situations that the method for determining a terminal flight path and the avionics apparatus and computer program product implementing the method detect include cases where CTP is less than ITP. In such case, the plane as currently being flown will not land at the ITP. To correct, the pilot must actively change the factors that affect the Horizontal Distance to Landing Adjustment Factor (HDLAF) or maximum Horizontal Distance to Landing Adjustment Factor (HDLAF$_{MAX}$) discussed herein. The pilot must, for example, change the descent angle, add power, decrease drag, or increase lift. The invention provides a simple aural warning, such as "Landing Short," as well as a visual cue, as discussed below.

The situations that the method, avionics apparatus and computer program product of the invention detect also include cases where even MTP is closer than ITP. In this scenario, the invention computes that even by flying an optimum profile the aircraft will not attain the ITP given the current configuration, power settings, and atmospheric conditions.

The invention also detects situation where the aircraft has too much energy for the runway and forward CTP. In such situations, given the current flight profile, the aircraft will touch down too far along the runway to stop in the available remaining distance given the amount of energy it currently has. This situation is either computed directly by determining the tabulated land and stop distance for the plane given its current weight and configuration, or inferred as a function of the estimated forward CTP. Any excess airspeed is added to the estimated CTP, and the overshoot of the forward CTP beyond the ITP is then computed as a percentage of available runway length. When the aircraft has too much energy for the runway and forward CTP a warning is provided to the pilot.

In cases where the aircraft has too much energy for the runway and the forward CTP, by cross-referencing the determined actual descent angle against preset glideslope parameters and rate of descent parameters the invention also provides a warning that the glideslope that the pilot is flying to achieve the CTP should be moderated. For instance, a warning system for commercial airliners is strapped to allow an acceptable range of 2.0 to 4.5 degrees and a maximum descent rate of 300 fpm. When the flight profile being flown by the pilot exceeds these limitations, a warning is provided.

The invention also detects lateral touchdown deviations of the type illustrated in FIG. 5. Given the ITP and the plane's lateral CTP, the invention either retrieves the runway centerline and direction or path from the database 136 of stored runway information, or retrieves the location of runway centerline end-points from the database 136 and computes the runway direction or path. The invention then provides any of simple aural alerts, warnings and visual cues indicating to the pilot that the aircraft is lined up off the runway centerline 2. With the GPS Selective Availability turned off, the current lateral accuracy of GPS is approximately 9 meters RMS.

This accuracy enables the warning system of the invention to warn the pilot of a potential misalignment off the intended runway, thereby enabling the pilot to achieve a stabilized approach much sooner than visual cues would permit and avoid a mishap.

Aural Alerts are provided by the warning system of the invention to the flight crew to indicate that any of the previously described deviations or hazards exist. The Aural Warning optionally advises of a potential solution, such as "Add Power" or "Reduce Speed".

Visual Indication of Glidepath Errors and Lateral Line-Up Errors

The warning system of the invention presents the pilot with a simple visual indicator that shows the plane's forward and lateral CTP relative to the ITP. Dangerous situations such as forward CTP being closer than ITP are indicated by changing colors, flashing lights, or changing icons.

In the case where a plane's flightpath will take it to a lateral CTP located off the runway centerline by a predetermined amount, where the predetermined amount is for example a function of runway width as retrieved from the central navigation database 18, the invention provides visual cues to advise the pilot of a needed correction.

The warning system is also capable of providing the pilot with indications of a rapid rate of change in line up. For instance, if the plane is instantaneously lined up on runway centerline but the CTP is rapidly drifting to one side, the warning system optionally provides a visual cue to alert the pilot to this situation.

FIG. 14 illustrates an angle of attack indicator 200 of the current art. Military pilots, and now some civilian pilots, have long benefited from having the angle of attack indicator device 200 located in peripheral view on the edge of the primary field of view over the glareshield. This indicator shows the plane's speed relative to a preferred or "ideal" ideal approach angle of attack. This type of indicator provides the advantage that it is perceived by the pilot through peripheral vision. Also, it is a small package that can be easily retrofitted to existing cockpits. The invention provides an indicator device 200 of the type illustrated in FIG. 14 having extended abilities to provide warnings about the plane's flightpath to achieve the intended touchdown point. This simple visual warning system may achieve significant reductions in the number of mishaps that occur as aircraft maneuver during their last mile to landing. The invention provides changes in color and shape on the indicator that are easily perceived by the pilot without drawing primary attention unnecessarily away from viewing the runway environment.

FIGS. 15–20 illustrate the present invention embodied in a display 300 that provides visual indication of glidepath errors and lateral line-up errors. The position of the forward and lateral CTP relative to the ITP is displayed to the pilot using symbology in the cockpit. The invention is illustrated by example and without limitation as similar to the known visual landing aid used on the deck of aircraft carriers. A "Ladder" forward glidepath indicator 302 of colored lights such as LED's are illuminated to represent the relative forward CTP and ITP positions. Optional tapering of the glidepath indicator 302 represents a perspective view to aid in the cognitive representation. The display 300 of the present invention as embodied in FIGS. 15–20 is similar in appearance to an angle of attack indicator 200 of the current art and is preferably also located in peripheral view on the edge of the primary field of view over the glareshield. In construction, the invention is a set of multicolored illumination sources such as Light Emitting Diodes (LEDs) concealed behind a thin, translucent white plastic shield. When inactive the pilot sees only the white plastic shield. When one or more of the LEDs is illuminated, it becomes visible through the plastic shield. By placing this device in the pilot's peripheral field of vision, the pilot concentration is normally undisturbed: the pilot only notices the display unit when an illuminated color appears, changes, moves or blinks.

The block 404 position on the indicator 302 indicates relative the position of forward CTP to ITP. The relative forward CTP position indicator block 304 is moved along the glidepath indicator 302 and changed in color to indicate divergence of the forward CTP from the ITP. For example, the relative forward CTP position indicator block 304 changes from a neutral color such as blue (shown) to a warning color such as amber and finally to a danger color such as red to indicate that the limit is exceeded. Opposed triangular center datum indicators 306 on either side of the tapered forward glidepath indicator 302 represent a centered datum for position reference. The center datum indicators 306 change from a neutral color such as green (shown) to a danger color such as red and optionally begin to flash to indicate that the aircraft has too much energy to land safely in the length of runway available.

A single row vertical triangular colored indicator LED's 308 in a horizontal centerline or lateral glidepath indicator block 310 below the forward glidepath indicator 302 indicate the current lateral CTP line-up error. Neutrally colored centerline or lateral glidepath indicator triangles 308, such as blue triangles, indicate line up within acceptable lateral deviations limits. Colored centerline indicator triangles 308 are illuminated to left or right to indicate port or starboard deviation. If lateral deviation limits are exceeded, amber centerline indicator triangles 308 are illuminated at either extreme of the horizontal block 310 of triangular colored centerline indicator LED's 308, as illustrated in a subsequent Figure.

FIG. 15 illustrates the display indication that the forward CTP coincides with the ITP and that the aircraft is correctly lined up with respect to the runway centerline. In this example, the relative forward CTP position indicator block 304 is positioned in the approximate vertical center of the forward glidepath indicator 302, thereby indicating that the forward CTP and ITP positions coincide at least within acceptable limits. Furthermore, the relative forward CTP position indicator 304 is positioned between the opposed triangular indicators 306 on either side of the tapered indicator 302, which indicates the vertically central position of the forward glidepath indicator block 302. The single centerline or lateral glidepath indicator triangle 308 is positioned at the center of the horizontal block 310 and is neutrally colored (blue shown), thereby indicating that the current lateral line-up is within acceptable limits.

FIG. 16 shows the single centerline or lateral glidepath indicator triangle 308 is positioned at the center of the horizontal block 310 and is neutrally colored, thereby indicating that the current lateral line-up is within acceptable limits. However, in this example, the relative forward CTP position indicator block 304 is positioned above the vertical center of the forward glidepath indicator 302, thereby indicating that the CTP position deviates from the ITP position and the aircraft is landing long, beyond the ITP.

FIG. 17 shows the relative forward CTP position indicator block 304 is positioned significantly below the vertical center of the forward glidepath indicator 302, indicating that the forward CTP position is short relative to the ITP position so that the aircraft will land significantly short of the runway threshold and the ITP. Optionally, the color of the relative forward CTP position indicator 304 is changed to a danger color such as red (shown) or otherwise modified to draw visual attention. The single centerline or lateral glidepath indicator triangle 308 is positioned off (left) of the center of the horizontal block 310 but is still neutrally colored, thereby indicating that the aircraft is currently laterally lined-up for a touchdown point outside of acceptable limits.

Figure 18:
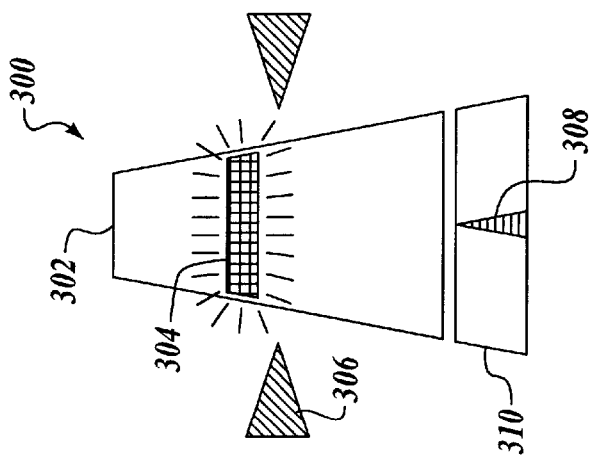

FIG. 18 shows the single centerline or lateral glidepath indicator triangle 308 is positioned at the center of the horizontal block 310 and is neutrally colored (not shown), thereby indicating that the current lateral line-up is within acceptable limits. In this example, the relative forward CTP position indicator block 304 is positioned only slightly above the vertical center of the forward glidepath indicator 302, thereby indicating that the forward CTP position deviates slightly from the ITP position and the aircraft is landing a little bit long, beyond the ITP. However, the normally neutral colored relative forward CTP position indicator block 304 changed to either a warning color such as amber (shown) or a danger color such as red and begins flashing or otherwise drawing visual attention. The relative forward CTP position indicator 304 thereby indicates that the aircraft has too much energy to land in the length of runway remaining beyond the estimated forward CTP.

Figure 19:
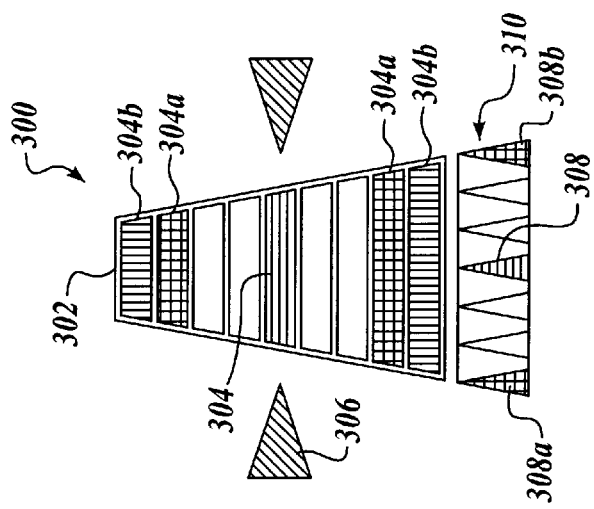

In FIG. 19 the aircraft is correctly aimed at the ITP so that the forward CTP coincides with the ITP within acceptable safety limits but the lateral CTP is lined up well off centerline. Therefore, the relative forward CTP position indicator block 304 is illuminated at the approximate vertical center of the glidepath indicator 302 and remains neutrally colored (color not shown). The relative forward CTP position indicator blocks 304a and 304b are shown at the closer and further extremes of the glidepath indicator 302 as examples of the relative warning and danger positions, respectively, of the relative forward CTP position indicator 304. These relative CTP position indicator blocks 304a and 304b are illuminated as appropriate to indicate warning and danger situations according to the invention. For example, the relative forward CTP position indicator blocks 304a and 304b may be colored warning and danger colors, respectively, such as yellow and red.

The vertical triangular colored indicator LED's 308 in the horizontal centerline or lateral glidepath indicator block 310 below the glidepath indicator 302 indicate the current lateral line-up error. For example, when a single neutrally colored lateral glidepath indicator 308 is positioned at the center of the horizontal lateral glidepath indicator block 310, the lateral CTP corresponds to the ITP within acceptable limits. When the CTP shifts laterally away from the ITP, one of multiple lateral glidepath indicators to left and right of center are illuminated as a function of the degree of lateral deviation and whether the lateral deviation from the ITP is port or starboard. The lateral CTP deviation indicators 308a, 308b are positioned at either extreme of the lateral glidepath indicator block 310. These lateral glidepath deviation indicators 308a, 308b are illuminated having either a warning color such as amber (shown) or a danger color such as red as a function of the glidepath's lateral deviation from the runway centerline. Optionally, the illuminated lateral glidepath indicator 308a or 308b begins flashing (not shown) or otherwise increases the draw of visual attention.

Figure 20:
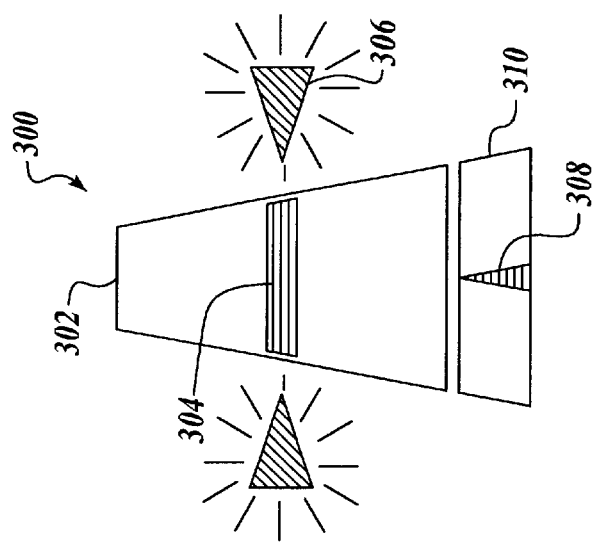

FIG. 20 illustrates the display 300 of the invention that provides visual indication of glidepath errors and lateral line-up errors when the aircraft is correctly aimed at the ITP and centerline, but its glidepath exceeds a pre-programmed descent profile limitations, such as descent angle or vertical speed. The display 300 indicates that the forward CTP coincides with the ITP and that the aircraft is correctly lined up with respect to the runway centerline. The display 300 shows the relative forward CTP position indicator 304 positioned in the approximate vertical center of the glidepath indicator 302, thereby indicating that the forward CTP and ITP positions coincide at least within acceptable limits. Furthermore, the relative forward CTP position indicator 304 is positioned between the opposed triangular center indicators 306 on either side of the tapered indicator 302, which cognitively indicates the vertically central position of the relative forward CTP position indicator 304 on the forward glidepath indicator 302. The single centerline or lateral glidepath indicator triangle 308 is positioned at the center of the horizontal block 310 and is neutrally colored and without any of the lateral deviation glidepath indicators 308a, 308b being in evidence, thereby indicating that the current lateral CTP line-up is within acceptable limits. However, the neutrally colored opposed triangular center datum indicators 306 on either side of the tapered indicator 302 are optionally changed to a warning color such as amber (not shown) or a danger color such as red (shown) and are flashing or otherwise drawing visual attention. The center datum indicators 306 thereby indicate that the current glidepath exceeds the pre-programmed descent profile limitations, such as descent angle or vertical speed.

Computer Program Product

In addition to being practiced as apparatus and methods, the present invention is also practiced as a computer program product for indicating deviation from a glide path, including deviation of forward and lateral CTP positions from an ITP position. With reference to FIGS. 11 and 13, respectively, the computer-readable storage medium may be part of the memory device 18, 104, and the processor 16, 106 of the present invention implements the computer-readable program code means to determine forward and lateral CTP positions, an ITP position, determine a correspondence between the forward and lateral CTP positions and the ITP position or deviation therebetween, and generate an alert as a function of the correspondence or deviation.

The computer program product of the invention includes computer program product of the invention is a computer-readable storage medium having computer-readable program code means embodied in the medium. The computer-readable program code means includes a first computer-readable program code means for determining a global position from a received plurality of navigation data, a second computer-readable program code means for determining an altitude above ground level from one or more received navigation datum, a third computer-readable program code means for retrieving a plurality of airport information from a database of airport information as a function of the position determined from the first computer-readable program code means, a fourth computer-readable program code means for determining an Intended Touchdown Point as a function of the airport information retrieved by the third computer-readable program code means, a fifth computer-readable program code means for determining a Current Touchdown Point as a function of the global position determined by the first computer-readable program code means and the altitude determined by the second computer-readable program code means, a sixth computer-readable program code means for determining correspondence between the Current Touchdown Point determined from the fifth computer-readable program code means and the Intended Touchdown Point determined from the fourth computer-readable program code means, and a seventh computer-readable program code means for outputting a signal as a function of the correspondence determined from the sixth computer-readable program code means.

According to one embodiment of the invention, the fifth computer-readable program code means, that for determining a Current Touchdown Point as a function of the global position and the altitude, includes computer-readable program code means for determining an actual glide path as a function of a plurality of subsequent global positions determined by the first computer-readable program code means and a plurality of subsequent altitudes determined by the second computer-readable program code means.

According to another embodiment of the invention, the sixth computer-readable program code means, that for determining correspondence between the Current Touchdown Point and the Intended Touchdown Point, includes computer-readable program code means for determining correspondence between the actual glide path and a predetermined glide path.

According to another embodiment of the invention, the seventh computer-readable program code means, that for outputting a signal as a function of the correspondence determined from the sixth computer-readable program code means, includes computer-readable program code means for outputting a signal as a function of the correspondence between the actual glide path and a predetermined glide path determined from the sixth computer-readable program code means.

According to another embodiment of the invention, the fifth computer-readable program code means, that for determining a Current Touchdown Point, also includes determining the Current Touchdown Point as a function of the global position, the altitude, and a received plurality of aircraft performance data.

According to another embodiment of the invention, the computer program product of the invention also includes computer-readable program code means for determining a current level of flight energy as a function of the plurality of aircraft performance data.

According to still another embodiment of the invention, the computer program product of the invention also includes computer-readable program code means for outputting a warning signal as a function of the current level of flight energy and the airport information.

According to yet another embodiment of the invention, the computer program product of the invention also includes computer-readable program code means for determining a descent rate as a function of subsequent altitudes above ground determined by the second computer-readable program code means over a period of elapsed time.

While the preferred embodiment of the invention has been illustrated and described, it will be appreciated that various changes can be made therein without departing from the spirit and scope of the invention.

What is claimed is:

1. A terminal flight path correspondence determination apparatus, comprising:

a means for receiving a plurality of navigation signals;

a means for determining a current position as a function of the navigation signals;

a means for determining an Intended Touchdown Point;

a means for determining a Current Touchdown Point;

a means for determining correspondence between the Current Touchdown Point and Intended Touchdown Point; and a means for outputting a signal representative of the correspondence between the Current Touchdown Point and Intended Touchdown Point.

2. The apparatus of claim 1 wherein the means for determining a Current Touchdown Point further comprises means for comparing subsequent navigation signals as a function of elapsed time between the subsequent navigation signals.

3. The apparatus of claim 1 wherein the means for determining a Current Touchdown Point further comprises determining a rate of descent.

4. The apparatus of claim 1, further comprising a means for retrieving a runway altitude information from a database of airport information; and wherein the means for determining a Current Touchdown Point further comprises determining an intersection with the runway.

5. The apparatus of claim 1 wherein the means for determining a Intended Touchdown Point further comprises a means for determining a glide path to the Intended Touchdown Point position;

the means for determining a Current Touchdown Point further comprises a means for determining an actual glide path as a function of one or more of the navigation signals; and the means for determining correspondence between the Current Touchdown Point and Intended Touchdown Point further comprises a means for determining deviation of the actual glide path from the glide path to the Intended Touchdown Point position.

6. The apparatus of claim 1 wherein the means for outputting a signal representative of the correspondence between the Current Touchdown Point and Intended Touchdown Point further comprises a means for generating one or more of an audio and a video signal.

7. The apparatus of claim 6 wherein the means for generating a video signal includes means for generating one or more of a signal representative of a deviation of a forward Current Touchdown Point from the Intended Touchdown Point and a signal representative of a deviation of a lateral Current Touchdown Point from the Intended Touchdown Point.

8. The apparatus of claim 7, further comprising means for displaying the video signal.

9. The apparatus of claim 1, further comprising a means for receiving a plurality of different aircraft data signals; and
wherein the means for determining a Current Touchdown Point further comprises a means for determining the Current Touchdown Point as a function of the aircraft data signals.

10. The apparatus of claim 1, further comprising a means for receiving a one or more data signals representative of atmospheric conditions; and
wherein the means for determining a Current Touchdown Point further comprises a means for determining the Current Touchdown Point as a function of the atmospheric data signals.

11. A terminal flight path deviation generator, comprising:
a stored database of airport runway location and elevation information accessible as a function of position;
a processor coupled to receive aircraft position and elevation data and coupled for retrieving the airport information from the database as a function of the aircraft position data, the processor being structured to operate a computer program for generating a Current Touchdown Point position, comparing the Current Touchdown Point position to a predetermined Intended Touchdown Point position, and generating a signal representative of deviation of the Current Touchdown Point position from the predetermined Intended Touchdown Point position; and
a cockpit warning indicator being coupled to receive the deviation signal and being structured to generate a warning as a function of the deviation signal.

12. The terminal flight path deviation generator of claim 11 wherein the processor is further structured to operate a computer program for generating the Intended Touchdown Point position.

13. The terminal flight path deviation generator of claim 11 wherein the cockpit warning indicator further comprises one or more of an audio annunciation device and a visual display device.

14. The terminal flight path deviation generator of claim 11 wherein the processor is further structured to operate a computer program for determining runway direction information.

15. The terminal flight path deviation generator of claim 14 wherein the processor is further structured to operate a computer program for generating an ideal glideslope to the Intended Touchdown Point position; and
wherein the processor is further structured to operate a computer program for determining deviation of an actual track from the ideal glideslope to the Intended Touchdown Point position.

16. The terminal flight path deviation generator of claim 15 wherein in the cockpit warning indicator further comprises a visual display device having a horizontal display portion for indicating a lateral deviation of the Current Touchdown Point position from the Intended Touchdown Point position.

17. The terminal flight path deviation generator of claim 16 wherein in the cockpit visual display device further comprises a ladder indicator for indicating deviation of the Current Touchdown Point position from the Intended Touchdown Point position.

18. The terminal flight path deviation generator of claim 11 wherein the processor is further coupled to receive aircraft performance data;
and the processor is further structured to operate a computer program for generating a Current Touchdown Point position as a function of the aircraft performance data.

19. An airport terminal flight path determination apparatus, comprising:
a memory having a stored database of airport information accessible as a function of position, the airport information including at least runway location and elevation (direction) information;
a processor structured to receive a plurality of navigation signals representative of a position and an altitude of a host aircraft, the processor being further structured to determine a host aircraft Current Touchdown Point position and elevation, to access the airport information as a function of the position the host aircraft, and to determine an Intended Touchdown Point position and elevation as a function of the airport information;
a signal generator operated by the processor, the generator being structured to retrieve the Current Touchdown Point and Intended Touchdown Point position and elevation information, compare the Current Touchdown Point and Intended Touchdown Point position and elevation information, and output a signal representative of a degree of coincidence of the Current Touchdown Point position and elevation with the Intended Touchdown Point position and elevation; and
a cockpit indicator structured to receive the signal output by the signal generator and responsively output an indication of the degree of coincidence of the Current Touchdown Point and Intended Touchdown Point position and elevation.

20. The apparatus of claim 19 wherein the cockpit indicator is further structured to annunciate audio information as a function of the degree of coincidence of the Current Touchdown Point and Intended Touchdown Point position and elevation.

21. The apparatus of claim 19, further comprising a source of host aircraft configuration, thrust, and trajectory data;
wherein the processor is further coupled to receive the aircraft configuration, thrust, and trajectory data;
and the processor is further structured to determine the Current Touchdown Point position and elevation as a function of the aircraft configuration, thrust, and trajectory data.

22. The apparatus of claim 19, further comprising a source of current atmospheric condition data;
wherein the processor is further coupled to receive the current atmospheric condition data;
and the processor is further structured to determine the Current Touchdown Point position and elevation as a function of the current atmospheric condition data.

23. The apparatus of claim 19 wherein:
the processor is further structured to determine a direction of the runway and a current glide path of the host aircraft;
the signal generator operated by the processor is further structured to retrieve the current glide path and runway direction information, compare the current glide path and runway direction information, and output a signal representative of a degree of coincidence of the current glide path and runway direction; and
the cockpit indicator structured to receive the signal output by the signal generator and responsively output an indication of the degree of coincidence of the current glide path and runway direction.

24. The apparatus of claim 23 wherein the cockpit indicator structured to output a visual display indication of the degree of coincidence of the current glide path and runway direction.

25. A method for using an electronic circuit to compare a signal conveying Current Touchdown Point data with a predetermined Intended Touchdown Point, the method comprising:

receiving a plurality of navigation signals;

retrieving runway information from a database as a function of one or more of the navigation signals;

determining a Current Touchdown Point relative to a runway as a function of the navigation signals;

determining an Intended Touchdown Point relative to the runway as a function of the runway information;

determining deviation of the Current Touchdown Point from the Intended Touchdown Point; and outputting a signal representative of the deviation of the Current Touchdown Point from the Intended Touchdown Point.

26. The method of claim 25, further comprising receiving a plurality of aircraft performance signals; and wherein determining a Current Touchdown Point further comprises determining the Current Touchdown Point as a function of the aircraft performance signals.

27. The method of claim 26, further-comprising:

determining a runway length;

determining a safe stopping distance after the Intended Touchdown Point;

determining deviation of the safe stopping distance and the runway length; and outputting a signal representative of the deviation of the safe stopping distance and the runway length.

28. The method of claim 25, further comprising receiving a plurality of atmospheric condition signals; and wherein determining a Current Touchdown Point further comprises determining the Current Touchdown Point as a function of the atmospheric condition signals.

29. The method of claim 25 wherein determining deviation of the Current Touchdown Point from the Intended Touchdown Point further comprises determining both a forward and a lateral deviation of the Current Touchdown Point from the Intended Touchdown Point.

30. The method of claim 29, further comprising generating a display representative of both the forward and lateral deviations of the Current Touchdown Point from the Intended Touchdown Point.

31. The method of claim 30 wherein:

determining an Intended Touchdown Point relative to the runway further comprises determining a preferred glide path;

determining a Current Touchdown Point relative to the runway further comprises determining an actual glide path; and determining deviation the lateral deviation of the Current Touchdown Point from the Intended Touchdown Point further comprises determining deviation of the actual glide path from the preferred glide path.

32. A computer program product for configuring an avionics device, the computer program product including:

a computer-usable medium having computer-readable code embodied therein for configuring a computer processor, the computer program product comprising:

computer-readable code configured to cause a computer processor to retrieve from storage on a computer-readable medium a set of airport information data;

computer-readable code configured to cause a computer processor to determine an Intended Touchdown Point as a function of the airport information data;

computer-readable code configured to cause a computer processor to access a set of aircraft position information;

computer-readable code configured to cause a computer processor to determine a current aircraft position as a function of the set of aircraft position information;

computer-readable code configured to cause a computer processor to determine a Current Touchdown Point as a function of the aircraft's current position; and computer-readable code configured to cause a computer processor to determine a correspondence of the Current Touchdown Point and Intended Touchdown Point, and to generate an output signal as a function of the correspondence.

33. The computer program product of claim 32, further comprising computer-readable code configured to cause a computer processor to generate a real-time instantaneous correspondence indication as a function of the correspondence signal.

34. The computer program product of claim 33 wherein the output signal generated as a function of the correspondence of the Current Touchdown Point and Intended Touchdown Point further comprises a warning indication signal generated as function of the real-time instantaneous correspondence exceeding a maximum permissible deviation.

35. The computer program product of claim 32, further comprising computer-readable code configured to cause a computer processor to determine a current glide path as a function of a plurality of subsequent sets of aircraft position information.

36. The computer program product of claim 35, further comprising computer-readable code configured to cause a computer processor to determine a correspondence of the current glide path and a predetermined glide path and to generate an output signal as a function of the correspondence.

37. The computer program product of claim 32, further comprising computer-readable code configured to cause a computer processor to access a set of aircraft performance data; and wherein the computer-readable code configured to cause a computer processor to determine the Current Touchdown Point further comprises computer-readable code configured to cause a computer processor to determine the Current Touchdown Point as a function of the aircraft performance data.

38. The computer program product of claim 37, further comprising computer-readable code configured to cause a computer processor to determine flightpath energy as a function of the aircraft performance data; and computer-readable code configured to cause a computer processor to determine a correspondence of the flightpath energy and the set of airport information data, and to generate an output signal as a function of the correspondence.

39. The computer program product of claim 32 further comprising computer-readable code configured to cause a computer processor to access a set of current atmospheric data; and wherein the computer-readable code configured to cause a computer processor to determine the Current Touchdown Point further comprises computer-readable code configured to cause a computer processor to determine a Current Touchdown Point as a function of the current atmospheric data.

40. A computer program product for indicating deviation from a glide path, wherein the computer program product comprises:

a computer-readable storage medium; and computer-readable program code means embodied in the medium, the computer-readable program code means comprising:

first computer-readable program code means for determining a global position from a received plurality of navigation data, second computer-readable program code means for determining an altitude above ground level from one or more received navigation datum, third computer-readable program code means for retrieving a plurality of airport information from a database of airport information as a function of the position determined from the first computer-readable program code means, fourth computer-readable program code means for determining an Intended Touchdown Point as a function of the airport information retrieved by the third computer-readable program code means, fifth computer-readable program code means for determining a Current Touchdown Point as a function of the global position determined by the first computer-readable program code means and the altitude determined by the second computer-readable program code means, sixth computer-readable program code means for determining correspondence between the Current Touchdown Point determined from the fifth computer-readable program code means and the Intended Touchdown Point determined from the fourth computer-readable program code means, and seventh computer-readable program code means for outputting a signal as a function of the correspondence determined from the sixth computer-readable program code means.

41. The computer program product of claim 40 wherein the fifth computer-readable program code means for determining a Current Touchdown Point as a function of the global position and the altitude further comprises computer-readable program code means for determining an actual glide path as a function of a plurality of subsequent global positions determined by the first computer-readable program code means and a plurality of subsequent altitudes determined by the second computer-readable program code means.

42. The computer program product of claim 41 wherein the sixth computer-readable program code means for determining correspondence between the Current Touchdown Point and the Intended Touchdown Point further comprises computer-readable program code means for determining correspondence between the actual glide path and a predetermined glide path.

43. The computer program product of claim 42 wherein the seventh computer-readable program code means for outputting a signal as a function of the correspondence determined from the sixth computer-readable program code means further comprises computer-readable program code means for outputting a signal as a function of the correspondence between the actual glide path and a predetermined glide path determined from the sixth computer-readable program code means.

44. The computer program product of claim 40 wherein the fifth computer-readable program code means for determining a Current Touchdown Point further comprises determining the Current Touchdown Point as a function of the global position, the altitude, and a received plurality of aircraft performance data.

45. The computer program product of claim 44, further comprising computer-readable program code means for determining a current level of flight energy as a function of the plurality of aircraft performance data.

46. The computer program product of claim 45, further comprising computer-readable program code means for outputting a warning signal as a function of the current level of flight energy and the airport information.

47. The computer program product of claim 40, further comprising computer-readable program code means for determining a descent rate as a function of subsequent altitudes above ground determined by the second computer-readable program code means over a period of elapsed time.

* * * * *